US009269174B2

(12) United States Patent
Frattarola et al.

(10) Patent No.: US 9,269,174 B2
(45) Date of Patent: Feb. 23, 2016

(54) METHODS AND SYSTEMS FOR GENERATING A POLYGON MESH

(71) Applicant: Disney Enterprises, Inc., Burbank, CA (US)

(72) Inventors: Gary Frattarola, San Diego, CA (US); Andi T. Smithers, San Diego, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 174 days.

(21) Appl. No.: 13/974,882

(22) Filed: Aug. 23, 2013

(65) Prior Publication Data

US 2015/0054844 A1    Feb. 26, 2015

(51) Int. Cl.
*G06T 11/40* (2006.01)
*G06T 9/00* (2006.01)

(52) U.S. Cl.
CPC .. *G06T 11/40* (2013.01); *G06T 9/00* (2013.01)

(58) Field of Classification Search
CPC ......... H04N 19/48; H04N 19/93; G06T 17/20
See application file for complete search history.

(56) References Cited

U.S. PATENT DOCUMENTS

| 5,295,235 A * | 3/1994 | Newman ..................... 345/619 |
| 2011/0002394 A1* | 1/2011 | Gandolph et al. ........ 375/240.23 |
| 2011/0229033 A1* | 9/2011 | Muquit ........................ 382/171 |

OTHER PUBLICATIONS

Imagination Technologies Ltd., "Power VR—A Master Class in Graphics Technology and Optimization", Imagination Technologies Ltd. presentation slides for Master Class in Graphics Technology and Optimization, Jan. 14, 2012, 50 pages, found at: http://www.imgtec.com/powervr/insider/powervr_presentations/GDC%20HardwarAndOptimisation.pdf.
U.S. Appl. No. 13/975,001, filed Aug. 23, 2013, Frattarola et al.

* cited by examiner

*Primary Examiner* — Antonio A Caschera
(74) *Attorney, Agent, or Firm* — Dorsey & Whitney LLP (57) ABSTRACT

The present application relates to methods and systems for generating polygon meshes. One example of a method for generating a polygon mesh includes scanning a plurality of lines of an image to determine one or more pixel run lengths of interest, building a collection of rectangles based on the one or more pixel run lengths from the plurality of lines, and simplifying the collection of rectangles by combining rectangles with similar widths and/or heights.

20 Claims, 7 Drawing Sheets

METHODS AND SYSTEMS FOR GENERATING A POLYGON MESH

BACKGROUND

In computer graphics, a quad may be used to render a two dimensional sprite onto a background. The quad is typically defined such that it includes all of the pixels of the sprite. Such quads, however, can include a large number of pixels that do not add anything to the sprite—e.g., that are rendered transparently onto the background. Even though rendering these pixels does not change the background displayed on the screen because they are transparent, the rendering hardware still processes them, and consumes resources that could otherwise be available for rendering other pixels. For example, unnecessarily rendering pixels may waste a portion of the finite fill rate typically available in rendering hardware. This waste of resources is even greater when the image has an alpha channel, because read-modify-write logic may be required for every pixel within the quad.

In order to reduce the number of pixels that are unnecessarily rendered, and to thereby free up a portion of the finite fill rate, a convex hull may be generated that convexly encapsulates the pixels of the sprite. The contours of the convex hull define the boundaries of pixels that will be rendered, which may encompass fewer transparent pixels than a simple quad. Even a convex hull, however, may include many transparent pixels.

DETAILED DESCRIPTION

Figure 1:
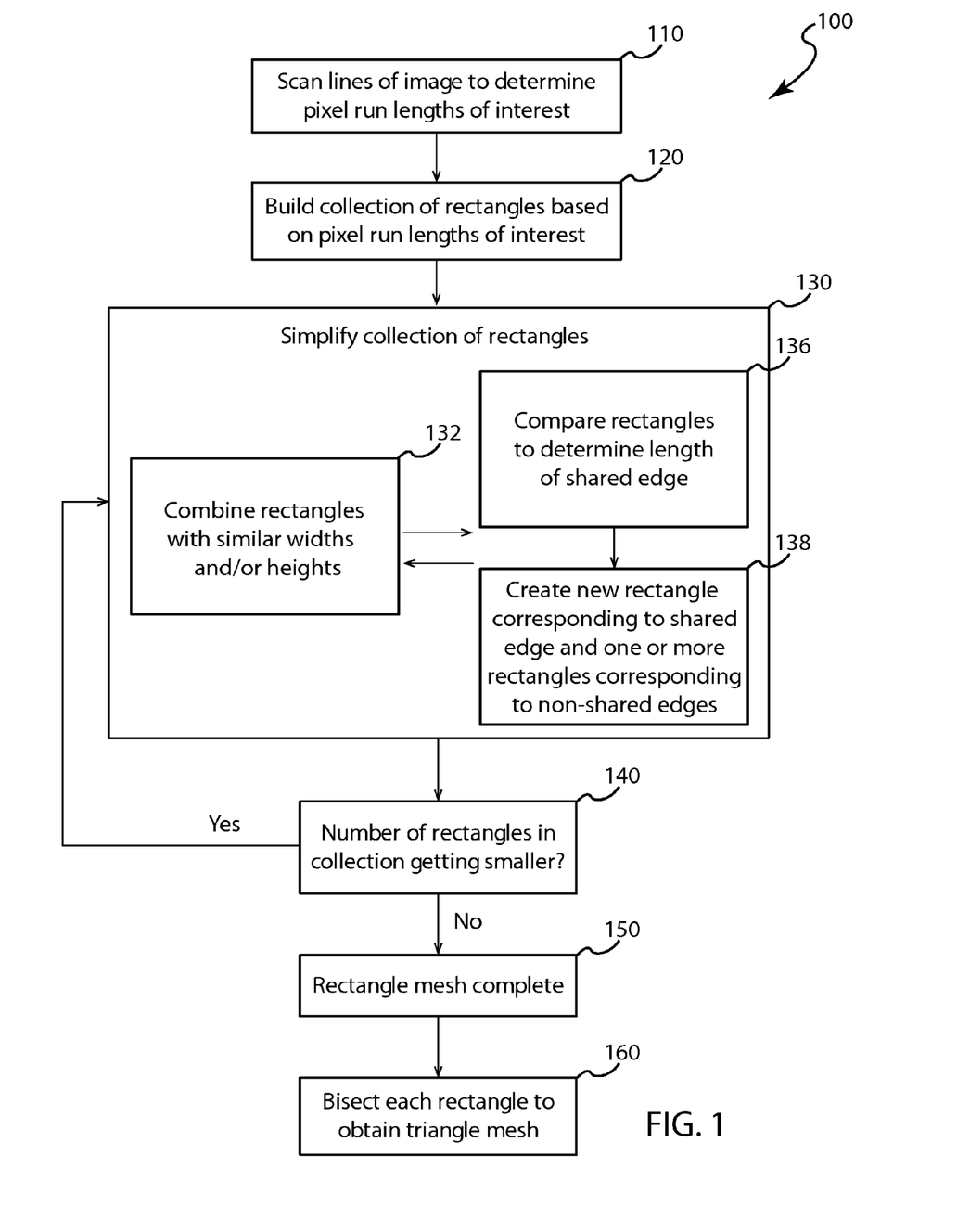
FIG. 1 is a flowchart for one embodiment of a method for generating a polygon mesh.

FIG. 1 illustrates a method 100 that may be used to generate a polygon mesh for use in rendering an image on a display. The method 100 may be performed by a computer graphics system, such as that shown in FIG. 7 and described below.

Method 100 may begin with operation 110, in which each of a plurality of lines of an image is scanned to determine one or more pixel run lengths of interest. The image may be a raster image, a texture map, or generally any type of image. Each line of the image may include no pixel run lengths of interest, one pixel run length of interest, or a plurality of pixel run lengths of interest.

The pixel run lengths of interest may be determined in some embodiments by inspecting alpha values for pixels in each of the plurality of lines. If, for example, the pixels of interest are translucent pixels, the pixel run lengths of interest will include pixels with alpha values corresponding to translucency. If, on the other hand, the pixels of interest are opaque pixels, the pixel run lengths of interest will include pixels with alpha values corresponding to opacity. If the pixels of interest are all visible pixels, the pixel run lengths of interest will include pixels with alpha values corresponding to either translucency or opacity.

In other embodiments, however, the pixel run lengths of interest may be determined in another manner—such as by inspecting color values. If, for example, a mesh encompassing all of the white or black pixels is desired, the pixel run lengths of interest may be determined by inspecting the color values for pixels in each of the plurality of lines. In one embodiment, the pixel run lengths of interest may be determined using chroma keying—for example, a specific color or range of colors may be designated as not being of interest in order to isolate a portion of an image from a background corresponding to the designated color or color range.

Referring still to operation 110, each line of the image (e.g., each horizontal line, or alternatively each vertical line) may be scanned until a pixel of interest is encountered. For a horizontal scan line, the x-position of the first pixel of interest may be noted, and the scan continues until either the scan line ends or until a pixel is encountered that is not of interest. The position of the last pixel of interest in that run length (or alternatively, the length of the run from the first pixel of interest to the last pixel of interest) is also noted. If there are still additional pixels on the current line, scanning continues to find additional possible run lengths, until the end of the line is encountered—at which point the same process is repeated for the next line, until the entire image has been scanned.

Figure 4A:
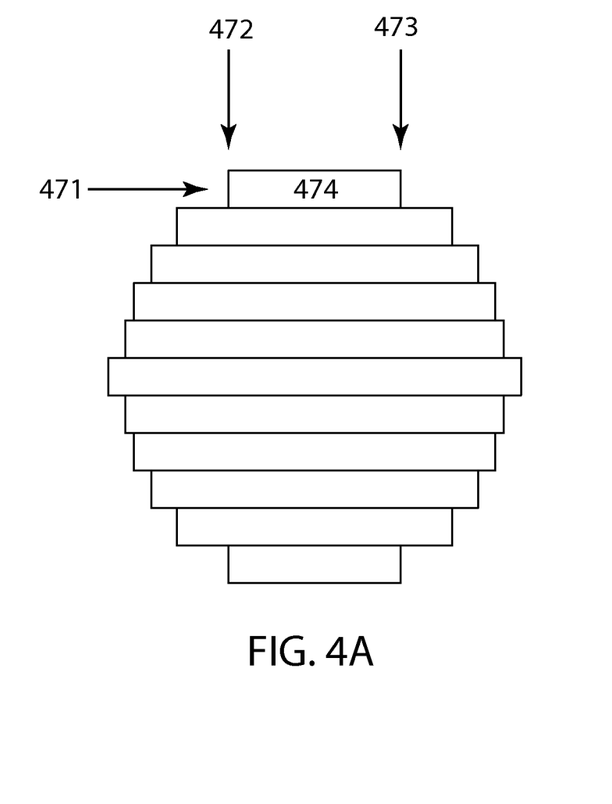
FIGS. 4A and 4B illustrate scan line run lengths that may be used during the process of generating a polygon mesh.

To illustrate operation 110, FIG. 4A shows a first horizontal line 471 of an image. The horizontal line 471 may be scanned until the first pixel of interest is encountered at x-position 472. The scanning then continues until the last pixel of interest for the run length is encountered at x-location 473. The relative positions of the two x-positions 472, 473 are noted, indicating a pixel run length of interest 474, and scanning continues. Because no further pixels of interest are encountered on horizontal line 471, scanning proceeds to the next horizontal line, and so on until all of the horizontal lines have been scanned, and the relative positions of the pixel run lengths of interest have been noted for each horizontal line.

Figure 4B:
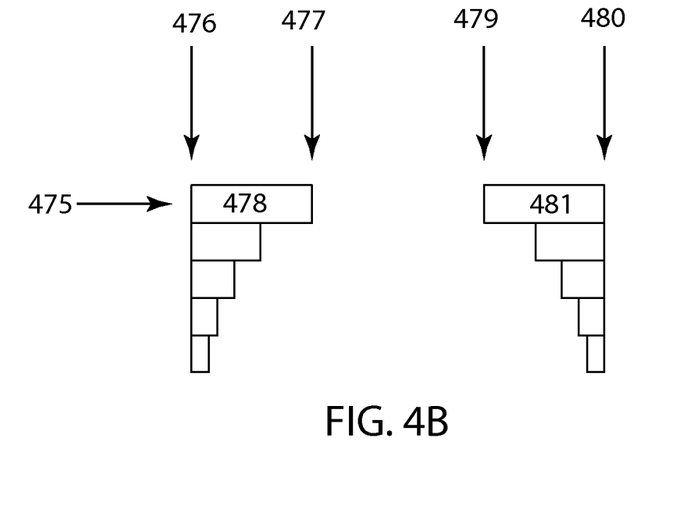

Similarly, FIG. 4B shows a first horizontal line 475, which includes a plurality of pixel run lengths of interest. In operation 110, horizontal line 475 may be scanned to determine the beginning x-position 476 and ending x-position 477 of a first pixel run length of interest 488, as well as the beginning x-position 479 and ending x-position 480 of a second pixel run length of interest 481.

In operation 120, a collection (e.g., a list) of rectangles is built based on the one or more pixel run lengths from the plurality of lines that were determined in operation 110. Depending on which pixels were deemed of interest in operation 110, the collection of rectangles may be built by including translucent and/or opaque pixel run lengths. A collection of rectangles with both translucent and opaque pixel run lengths may encompass all of the visible pixels in the image, but no transparent pixels in the image.

The collection of rectangles may be built in operation 120 by converting each of the scan line run lengths of interest into rectangles that are one pixel in height. Referring to FIGS. 4A and 4B, for example, each pixel run length of interest 474, 478, 481 may be converted into a one pixel high rectangle 474, 478, 481, with the left and right sides of the rectangles 474, 478, 481 defined by the respective beginning and ending x-positions of the pixel run lengths of interest and the top and bottom sides of the rectangles 474, 478, 481 defined by the y position of the horizontal lines 471, 475, respectively, within the image.

Referring again to the method 100 illustrated in FIG. 1, in operation 130, the collection of rectangles may be simplified—for example, the collection may be simplified in that the overall number of rectangles in the collection is reduced while the overall sizes of the rectangles increases. More specifically, in operation 132, one or more rectangles may be combined with one or more other rectangles in the collection that have similar widths and/or similar heights.

Figure 5A:
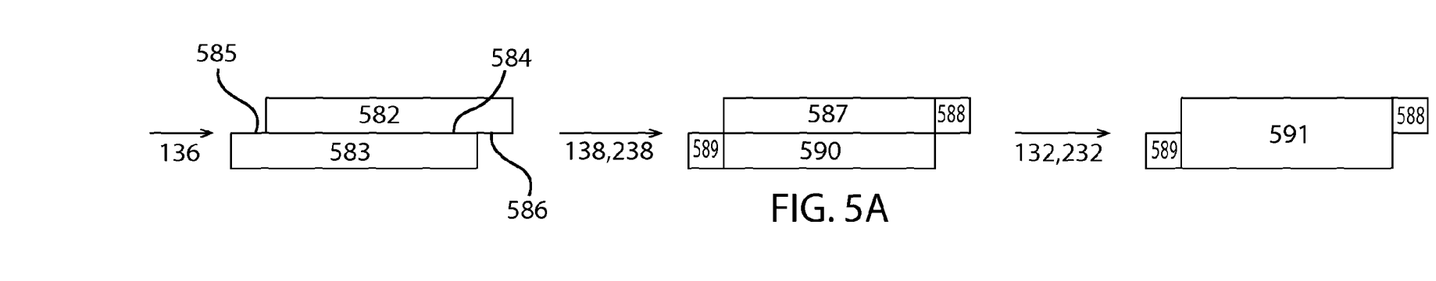
FIGS. 5A through 5C illustrate rectangles that may be divided and combined during the process of generating a polygon mesh.
Figure 5B:
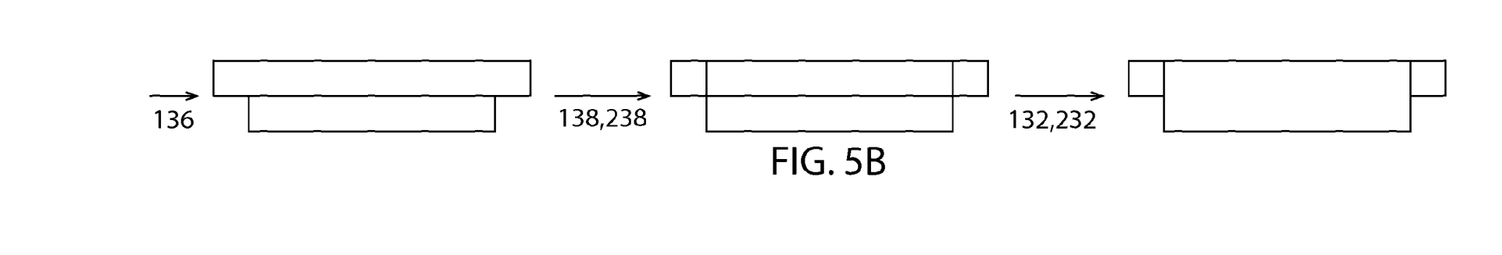
Figure 5C:
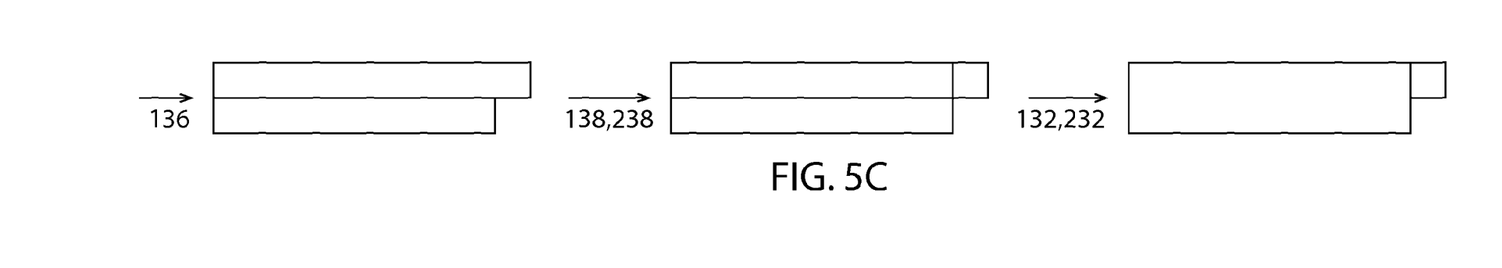

In operation 136, one or more of the rectangles in the collection of rectangles may be compared with one or more of the other rectangles in the collection of rectangles (such as two adjacent rectangles) to determine whether a first length of a shared edge between the (two adjacent) rectangles is greater than a second length of one or both of the (two adjacent) rectangles that is not shared between the (two adjacent) rectangles. If the first length is greater than the second length, one or more new rectangles may be created that correspond to the shared edge, and one or more additional new rectangles may also be created that correspond to one or more non-shared edges of the two adjacent rectangles in operation 138. Depending on the first and second lengths (i.e., depending on the length of the shared and non-shared edges of the rectangles), operation 138 may result in a temporary increase in the number of rectangles in the collection—as shown in FIGS. 5A through 5C, which are described below. This increase may, however, be counteracted in a subsequent iteration of operation 132, in which rectangles with similar heights and/or widths are combined. Alternatively, the increase may not be counteracted in some examples.

In some embodiments of operation 136, each of the rectangles in the collection of rectangles may be compared with every one of the other rectangles in the collection of rectangles to determine whether the rectangle of interest shares an edge with any of the other rectangles. Similarly, in operation 138, each of the rectangles in the collection of rectangles may be compared with every one of the other rectangles in the collection of rectangles to determine whether the rectangle of interest has a similar width and/or height as any of the other rectangles.

As described below in more detail with reference to FIG. 3, in some examples the shared edge referenced in operation 136 and 138 may be a horizontal shared edge, or it may be a vertical shared edge.

Referring again to operation 138, the one or more new rectangles and the one or more additional new rectangles may be added to the collection of rectangles, and the two adjacent triangles from which the one or more new rectangles and the one or more additional new rectangles were created may be removed from the collection of rectangles.

In some embodiments, operations 132, 136, and 138 may be performed iteratively, as described below with reference to FIG. 3.

To illustrate operations 132, 136, 138, FIG. 5A shows two pixel run lengths of interest 582, 583 that have been converted into rectangles 582, 583. In operation 136, the two rectangles 582, 583 may be compared to determine the length of the shared edge 584 between the two rectangles 582, 583—which in FIG. 5A is greater than the combined length of non-shared edges 585, 586. Thus, in operation 138, rectangle 582 may be divided into rectangles 587 (corresponding to shared edge 584), 588 (corresponding to non-shared edge 586), and rectangle 583 may be divided into rectangles 589 (corresponding to non-shared edge 585), 590 (corresponding to shared edge 584). Next, in operation 132, rectangles 587, 590 may be combined into new rectangle 591 because they have a similar width, which corresponds with shared edge 584 of rectangles 582, 583. FIGS. 5B and 5C also illustrate the operation of operations 132, 136, 138 for rectangles of different relative sizes.

Referring again to the method 100 illustrated in FIG. 1, in operation 140, the number of rectangles in the collection may be compared with the number of rectangles in the collection from the previous iteration of operation 130, and if the number of rectangles in the collection has gotten smaller, flow may return to operation 130 again. If the number of rectangles in the collection has ceased getting smaller (e.g., it increased as compared to the previous iteration), then flow continues to operation 150, in which the rectangle mesh is complete. In some examples, the completed rectangle mesh may correspond to the collection of rectangles as it existed immediately preceding the operation 130 in which the number of rectangles increased.

In operation 160 of method 100, the rectangles in the rectangle mesh from operation 150 may optionally be bisected in order to obtain a triangle mesh. The resulting rectangle or triangle mesh may in some embodiments be a pixel-accurate mesh that encompasses all of the pixels of interest and none of the pixels that are not of interest. For example, if both translucent and opaque pixels were included in the pixel run lengths of interest in operation 110, the resulting rectangular or triangular mesh may exactly circumscribe all of the visible pixels in the image and none of the transparent pixels in the image—such as the mesh 692 that is overlaid on the image 693 in FIG. 6.

In the event that the image is a texture map corresponding to a sprite, either the rectangle mesh from operation 150 or the triangle mesh from operation 160 may be used to render the sprite on a display. Again assuming that translucent and opaque pixels were included, using the mesh to render the sprite may use a minimum amount of fill rate by rendering only the visible pixels, and rendering none of the transparent pixels. Alternatively, if two different meshes were created—one for the translucent pixels and another for the opaque pixels, the opaque pixels may be rendered using a write only command, while the translucent pixels may be rendered using a read-modify-write command, thereby again using the minimum fill rate possible to render the sprite.

Alternatively, the polygon (e.g., rectangle or triangle) mesh may be used in one or more other manners. For example, the polygon mesh may be used as the basis for generating more complex geometry from the image—such as extruding the mesh to create a solid with an outline that exactly matches the visible parts of the image. As another example, a 3D topographic map may be created using color information (as opposed to the alpha values) of each pixel, where different colored pixels represent different topographic altitudes.

Figure 2:
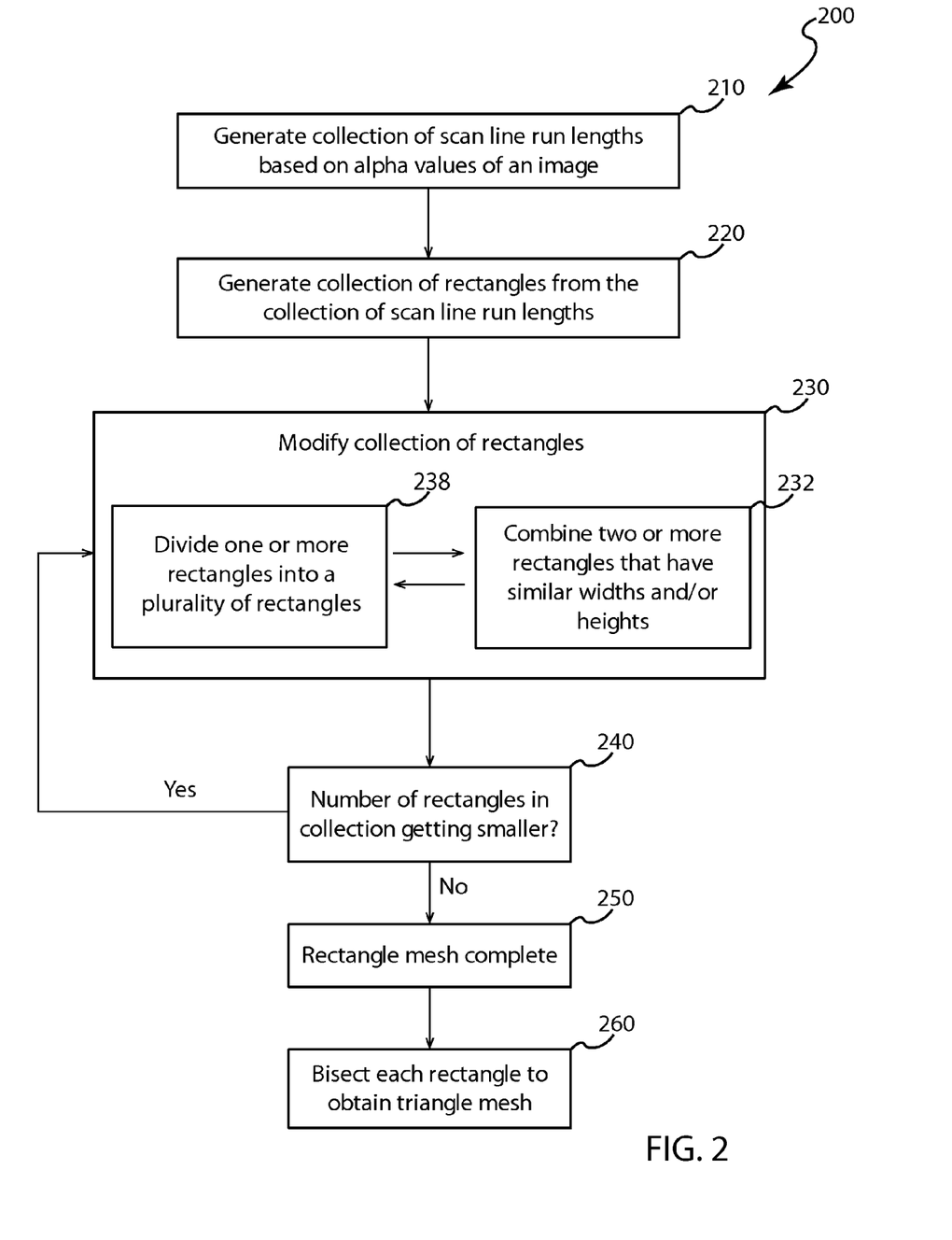
FIG. 2 is a flowchart for one embodiment of a method for generating a polygon mesh.

Turning now to FIG. 2, another embodiment of a method 200 is illustrated that may be used to generate a polygon mesh for use in rendering an image (e.g., raster image, texture map, etc.) on a display. Method 200 may be performed by a computer graphics system, such as that shown in FIG. 7 and described below, and may be in some respects similar to method 100 shown in FIG. 1 and described above.

Method 200 may begin with operation 210, in which a collection of scan line run lengths is generated based on alpha values of an image. The collection of scan line run lengths may be generated by scanning each row of pixels in the image from left to right, or from right to left. Alternatively, the scan line run lengths may be vertical—in which case they would be generated by scanning each column of pixels in the image from top to bottom or bottom to top. In operation 220, a collection of rectangles may be created by associating each respective scan line run length with a respective rectangle.

FIGS. 4A and 4B illustrate the use of operations 210, 220 on an image. Specifically, in operation 210, scan line run lengths 474, 478, 481 may be generated based on first and last included pixel positions 472, 473, 476, 477, 479, 480 of respective scan lines of respective images—with the included pixels being determined based on the alpha values of each pixel. In operation 220, each of the scan line run lengths 474, 478, 481 may be converted to a respective rectangle 474, 478, 481.

Returning to method 200 as illustrated in FIG. 2, the collection of rectangles may be modified in operation 230. Specifically, in operation 238, one or more rectangles in the collection of rectangles may be divided into a plurality of rectangles. In operation 232, two or more adjacent rectangles in the collection may be combined if they have similar widths and/or heights.

In some embodiments, one (or more) rectangles may be divided into the plurality of rectangles in operation 238 so that one of the plurality of (new) rectangles can be combined with an adjacent rectangle in operation 232. In other embodiments, two rectangles in the collection of rectangles may each be divided into a respective plurality of rectangles in operation 238, and one of the plurality of rectangles from a first of the two rectangles may be combined with one of the plurality of rectangles from a second of the two rectangles in operation 232.

In some embodiments, operations 232 and 238 may be done iteratively—for example until the collection of rectangles ceases to decrease in number (see operation 240 below).

FIGS. 5A through 5C illustrate the use of operations 232, 238 on an image. In FIG. 5A specifically, rectangles 582 and 583 are each divided into rectangles 587, 588 and 589, 590, respectively, in operation 238. In operation 238, rectangles 587 and 590 are combined into rectangle 591 because they have a similar width.

Returning to FIG. 2, the number of rectangles in the collection may be compared in operation 240 with the number of rectangles in the collection from the previous iteration of operation 230, and, if the number of rectangles in the collection has gotten smaller, flow may return to operation 230 again. If the number of rectangles in the collection has ceased getting smaller (e.g., it increased as compared to the previous iteration), then flow continues to operation 250, in which the rectangle mesh is complete. In some examples, the completed rectangle mesh may correspond to the collection of rectangles as it existed immediately preceding the operation 230 in which the number of rectangles increased.

Figure 6:
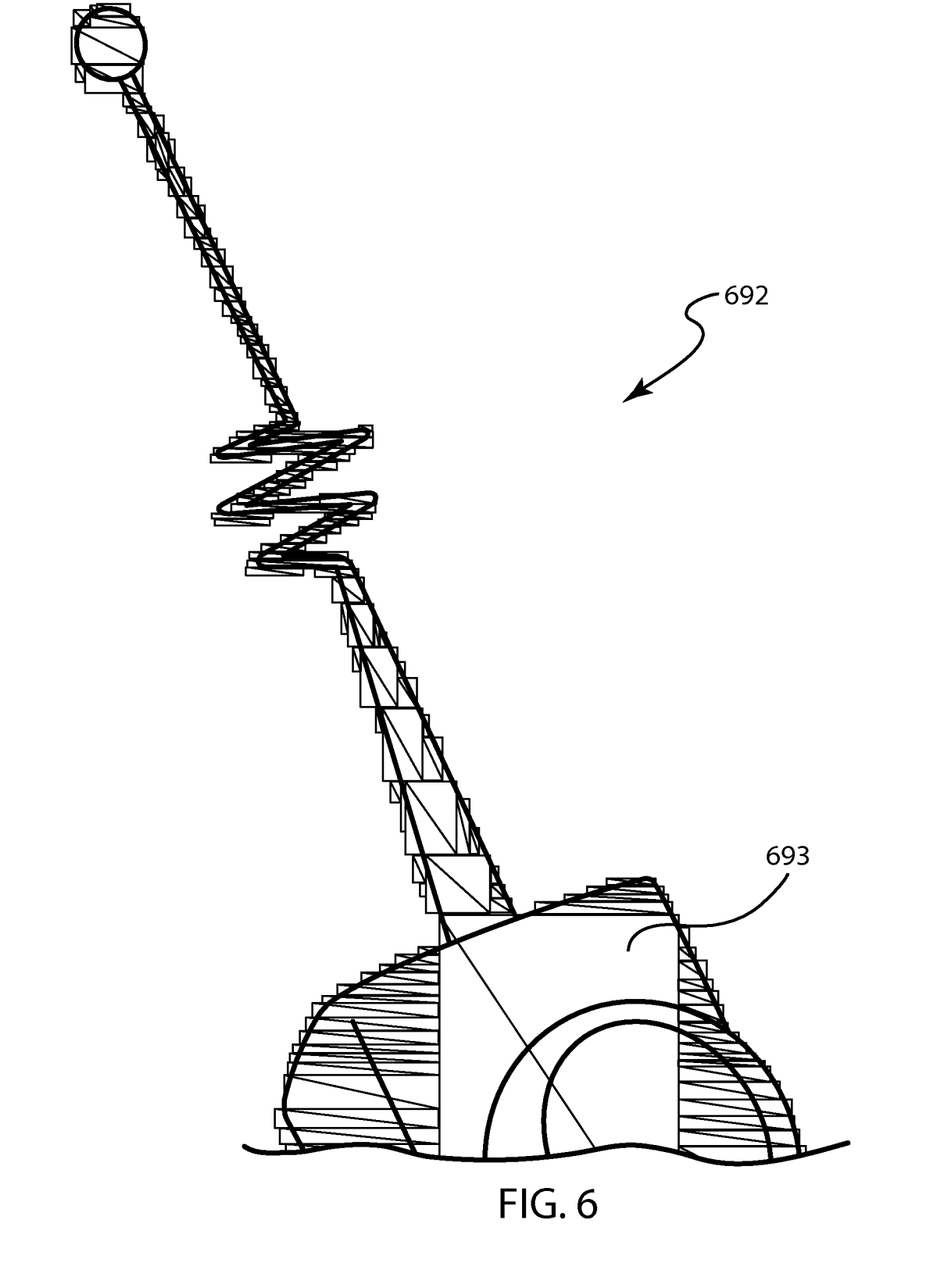
FIG. 6 illustrates one example of a polygon mesh overlaid on an image.

In operation 260, the rectangles in the rectangle mesh from operation 250 may optionally be bisected in order to obtain a triangle mesh. The polygon (e.g., rectangle, triangle) mesh resulting from method 200 may be used in many different manners, including those described above. FIG. 6 illustrates one example of a mesh 692 overlaid on image 693 that may be obtained by following the operations in method 200.

Figure 3:
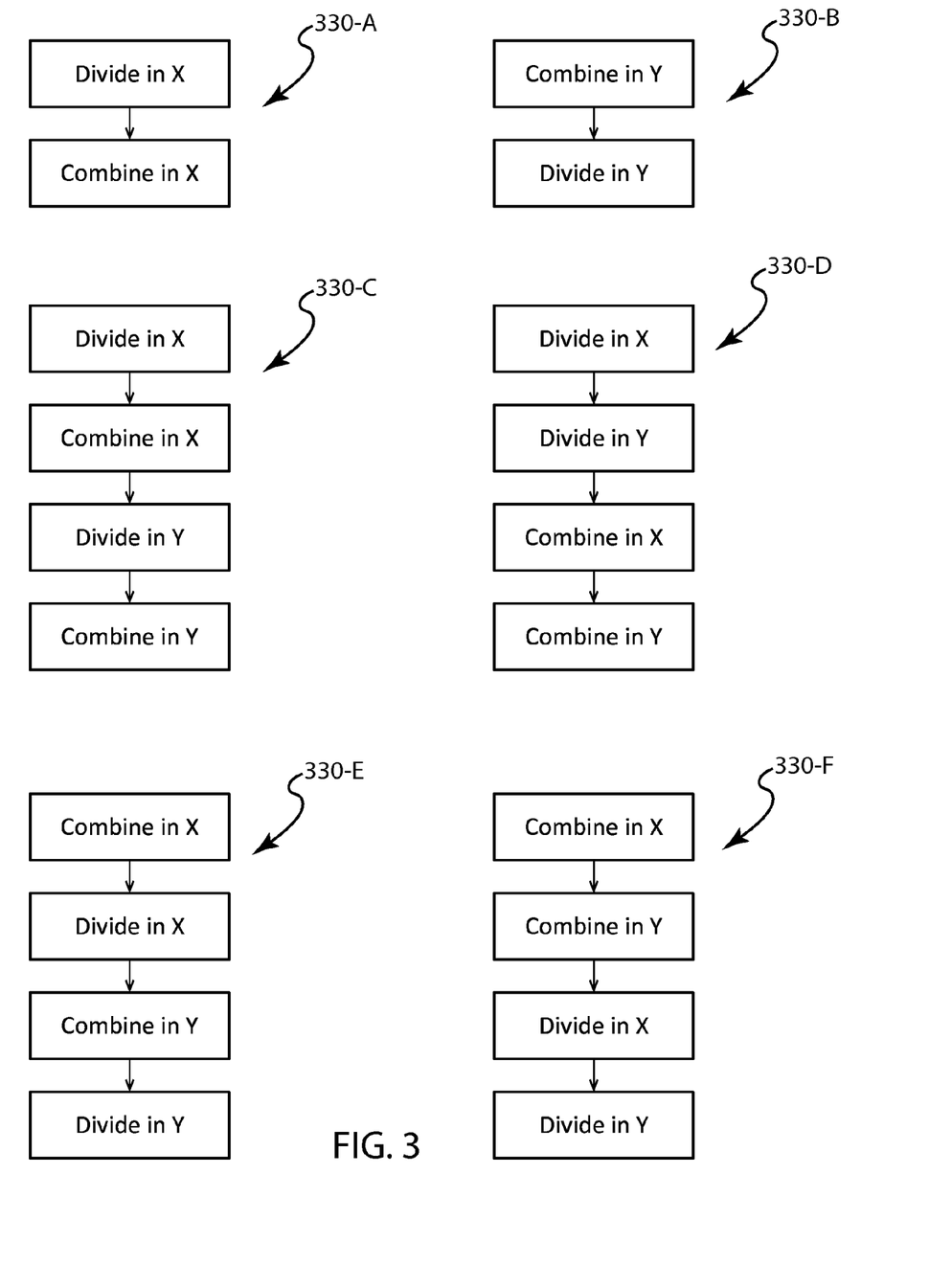
FIG. 3 is a flowchart for one embodiment of a method for generating a polygon mesh.

With reference now to FIG. 3, the operation 130 in method 100 and the operation 230 in method 200 may take many different forms. As previously mentioned, the respective sub-operations 132, 136, 138 and 232, 238 may be done iteratively, and may be done with respect to horizontal and/or vertical lines of an image. For example, operations 130, 230 may be performed in a horizontal dimension only, in a vertical dimension only, in horizontal and then vertical dimensions, in vertical then horizontal dimensions, and so forth.

Further, the relative order of sub-operations 132, 136, 138, 232, 238 within operations 130, 230 may be varied in different embodiments. In one example, as illustrated by the flowchart 330-A, operation 130 may begin with the division of rectangles in sub-operations 136/138 performed in the X (horizontal) dimension, followed by the combination of rectangles in sub-operation 132 performed in the X dimension. Similarly, still referring to flowchart 330-A, operation 230 may begin with the division of rectangles in sub-operation 238 performed in the X dimension, followed by the combination of rectangles in sub-operation 232 performed in the X direction.

Flowcharts 330-B, 330-C, 330-D, 330-E, and 330-F also illustrate a few additional combinations of relative orders for sub-operations 132, 136, 138, 232, 238 within operations 130, 230. Of course, many other combinations are possible, including iterative combination of the sub-operations 132, 136, 138, 232, 238, as described above.

A simplified computer graphics system 700 that may be configured to carry out the methods 100, 200 and operations described above is illustrated in FIG. 7. Generally, the computer graphics system 700 includes at least one central processor 702 and one or more graphics processors 704. In some embodiments, the at least one central processor 702 and the one or more graphics processors 704 include at least one multicore processor, such as a dual core or quad core processor, for example. In some embodiments, a plurality of processors may be configured to operate in parallel. Additionally, in some embodiments, the central processor 702 and the graphic processor 704 may be part of the same group of processing cores.

Figure 7:
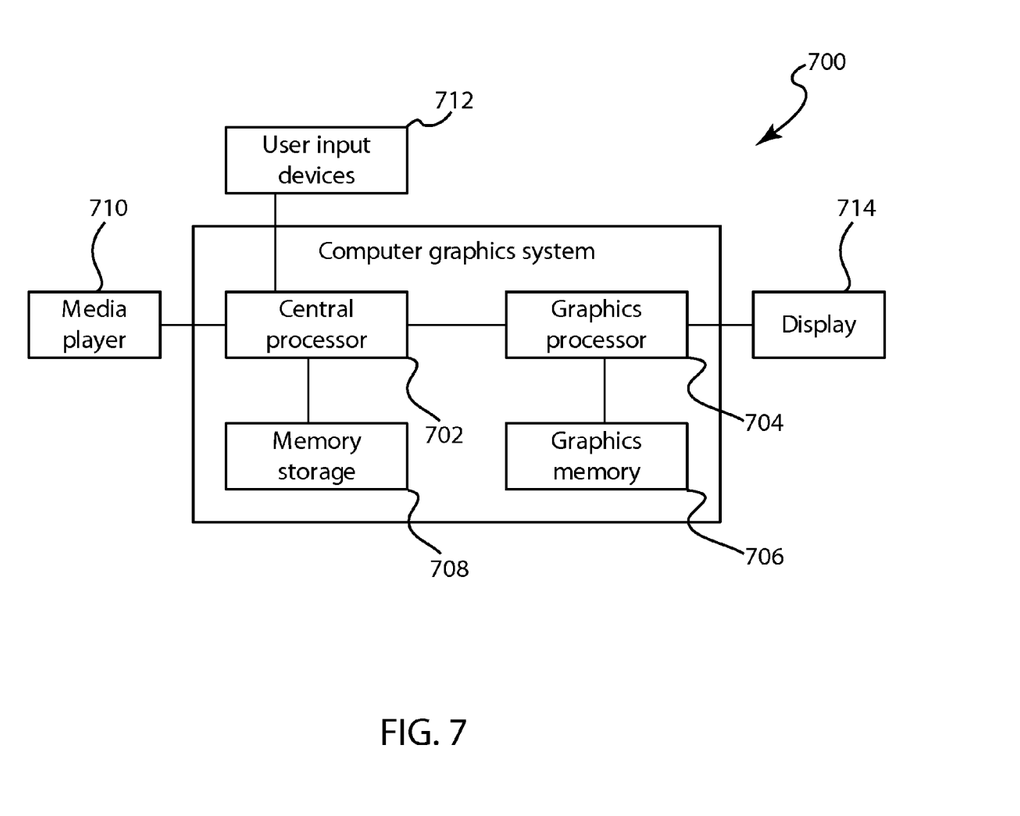
FIG. 7 is a block diagram of a computer graphics system for generating a polygon mesh.

The computer graphics system 700 includes a graphics memory 706 coupled directly to the graphics processor 704. The graphics memory 706 functions as execution memory and may have a relatively large memory capacity. Execution memory may include various forms of random access memory (RAM), such as dynamic RAM, static RAM, and the like. In addition to the dedicated graphics memory 706, memory/storage 708 is coupled to the central processor 702. In some embodiments, external storage may be provided and communicatively coupled to the computer graphics system. Large amounts of information and data accessible by the processor 702 may be stored on the storage device. The storage device may be a hard disk drive, a solid-state drive, or the like.

Additionally, one or more types of media players/recorders 710 are coupled to the computer graphics system 700, such as DVD drives, compact disc drives, and so forth. In some embodiments, the one or more media players may be integrated within the system 700. Image data used to generate the meshes described above may be stored on one or more types of media using the media player/recorders 710 for playback in other devices and in other environments.

User input may be provided to the system 700 via user input devices 712. The user input devices 712 may include a keyboard, a mouse, a track ball, a stylus, a camera, and so forth. The user input devices 712 allow a user to control the system 700 and provide input to the system to manipulate data to achieve a desired result.

Further, the computer graphics system 700 includes a display 714 coupled to the graphics processor 704, such as a plasma, LCD, CRT, etc., display to graphically display images and allow for interaction with a user. As such, the computer graphics system is suited to generate polygon meshes as described above, as well as to render one or more images (e.g., a sprite) on the display 714 using the polygon meshes.

The systems and associated methods in accordance with the present disclosure have been described with reference to particular examples thereof in order to illustrate the principles of operation. The above description is thus by way of illustration and not by way of limitation. Various modifications and alterations to the described examples will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure. Accordingly, it is intended that all such alterations, variations, and modifications of the disclosed examples are within the scope of this disclosure. For example, while FIGS. 1 and 2 illustrate embodiments of methods 100, 200 for generating a polygon mesh, the variations and comments described with reference to method 100 may be applied to the operations in method 200 as appropriate, and vice versa.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed examples. Steps or acts described in sequential order may be implemented before, after, sequentially or non-sequentially as may fit the particular description.

All relative and directional references (including vertical, horizontal, up, down, left, right, top, bottom, and so forth) are given by way of example to aid the reader's understanding of the particular examples described herein—although it will be understood that implementations of the present disclosure may include variations on the specific relative and directional references used based on the frame of reference of specific implementations.

What is claimed is:

1. A method of generating a polygon mesh, comprising:
    scanning by a processing element a plurality of lines of an image to determine one or more pixel run lengths of interest;
    building by the processing element a collection of polygonal mesh rectangles based on the one or more pixel run lengths from the plurality of lines;
    simplifying by the processing element the collection of polygonal mesh rectangles by combining polygonal mesh rectangles having at least one of a similar width or a similar height; and
    generating by the processing element a polygon mesh based on the simplified collection of polygonal mesh rectangles.

2. The method of claim 1, further comprising:
    comparing by the processing element two adjacent polygonal mesh rectangles in the collection of polygonal mesh rectangles to determine whether a first length of a shared edge between the two adjacent polygonal mesh rectangles is greater than a second length of one or both of the two adjacent polygonal mesh rectangles that is not shared between the two adjacent polygonal mesh rectangles; and
    if the first length is greater than the second length, creating by the processing element a first new polygonal mesh rectangle corresponding to the shared edge and one or more additional new polygonal mesh rectangles corresponding to one or more non-shared edges of the two adjacent polygonal mesh rectangles.

3. The method of claim 2, wherein each of the polygonal mesh rectangles in the collection of polygonal mesh rectangles is compared by the processing element with each of the other polygonal mesh rectangles in the collection of polygonal mesh rectangles to determine whether each of the polygonal mesh rectangles shares an edge with one or more of the other polygonal mesh rectangles, further wherein each of the polygonal mesh rectangles in the collection of polygonal mesh rectangles is compared by the processing element with each of the other polygonal mesh rectangles in the collection of polygonal mesh rectangles to determine whether each of the polygonal mesh rectangles has a similar width and/or height as one or more of the other polygonal mesh rectangles.

4. The method of claim 2, wherein the shared edge is a horizontal shared edge.

5. The method of claim 2, further comprising removing by the processing element the two adjacent polygonal mesh rectangles from the collection of polygonal mesh rectangles and adding the first new polygonal mesh rectangle and the one or more additional new polygonal mesh rectangles to the collection of polygonal mesh rectangles.

6. The method of claim 1, wherein the one or more pixel run lengths of interest are determined by the processing element by inspecting alpha values for pixels in the plurality of lines.

7. The method of claim 6, wherein the collection of polygonal mesh rectangles is built by the processing element by including translucent pixel run lengths.

8. The method of claim 7, wherein the collection of polygonal mesh rectangles is built by the processing element by also including opaque pixel run lengths.

9. The method of claim 8, wherein the collection of polygonal mesh rectangles together encompasses all visible pixels in the image but no transparent pixels in the image.

10. The method of claim 6, wherein the collection of polygonal mesh rectangles is built by the processing element by including opaque pixel run lengths.

11. The method of claim 1, further comprising rendering a sprite on a display using the generated polygon mesh.

12. A method of generating a polygon mesh, comprising:
    generating by a processing element a collection of scan line run lengths based on alpha values of an image;
    generating by the processing element a collection of polygonal mesh rectangles by associating each respective scan line run length with a respective polygonal mesh rectangle;
    modifying by the processing element the collection of polygonal mesh rectangles by
        dividing one or more polygonal mesh rectangles in the collection of polygonal mesh rectangles into a plurality of polygonal mesh rectangles; and
        combining two or more adjacent polygonal mesh rectangles in the collection of polygonal mesh rectangles that have at least one of a similar width or a similar height to generate a simplified collection of polygonal mesh rectangles; and
    generating by the processing element a polygon mesh based on the simplified collection of polygonal mesh rectangles.

13. The method of claim 12, wherein the one or more polygonal mesh rectangles in the collection of polygonal mesh rectangles is divided by the processing element into a plurality of polygonal mesh rectangles so that one of the plurality of polygonal mesh rectangles can be combined with an adjacent polygonal mesh rectangle.

14. The method of claim 12, wherein two polygonal mesh rectangles in the collection of polygonal mesh rectangles are each divided by the processing element into a respective plurality of polygonal mesh rectangles, and one of the plurality of polygonal mesh rectangles from a first of the two polygonal mesh rectangles is combined by the processing element with one of the plurality of polygonal mesh rectangles from a second of the two polygonal mesh rectangles.

15. The method of claim 12, wherein said steps of dividing and combining are done by the processing element iteratively.

16. The method of claim 15, wherein said iterative steps of dividing and combining continue until the collection of polygonal mesh rectangles ceases to decrease in number.

17. The method of claim 15, further comprising generating by the processing element a collection of triangles by bisecting each of the polygonal mesh rectangles in the modified collection of polygonal mesh rectangles.

18. The method of claim 12, wherein the image is a texture map.

19. The method of claim 12, wherein the collection of scan line run lengths is generated by the processing element by scanning each row of pixels from left to right.

20. A system, comprising:
   a processor configured to
      scan a plurality of lines of an image to determine one or more pixel run lengths of interest, build a collection of polygonal mesh rectangles based on the one or more pixel run lengths from the plurality of lines, simplify the collection of polygonal mesh rectangles by combining polygonal mesh rectangles at least one of a similar width or a similar height;
      generate a polygon mesh based on the simplified collection of polygonal mesh rectangles; and
   a display coupled to the processing unit and configured to render the image using the polygon mesh generated by the processing unit.

* * * * *